United States Patent
Ayaki

(10) Patent No.: US 7,190,879 B2
(45) Date of Patent: Mar. 13, 2007

(54) RECORDING AND REPRODUCTION APPARATUS, MEDIUM AND INFORMATION ASSEMBLY

(75) Inventor: Yasushi Ayaki, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1207 days.

(21) Appl. No.: 09/891,626

(22) Filed: Jun. 26, 2001

(65) Prior Publication Data

US 2002/0051624 A1    May 2, 2002

(30) Foreign Application Priority Data

Jun. 27, 2000    (JP)    ............................. 2000-193463

(51) Int. Cl.
*H04N 5/91*    (2006.01)
*G06F 12/14*    (2006.01)

(52) U.S. Cl. ........................................ 386/94; 711/163
(58) Field of Classification Search .................... 380/5, 380/201, 205, 228; 711/163; 386/94; 713/160
See application file for complete search history.

(56) References Cited

U.S. PATENT DOCUMENTS 6,584,552 B1 *    6/2003    Kuno et al. .................. 711/163

FOREIGN PATENT DOCUMENTS

| EP | 0 789 361 A2 | 8/1997 |
|---|---|---|
| EP | 0 812 092 A2 | 12/1997 |
| EP | 0 944 081 A2 | 9/1999 |
| JP | 62-231351 | 10/1987 |
| JP | 3-87945 | 4/1991 |
| JP | 4-017160 | 1/1992 |
| JP | 5-53895 | 3/1993 |
| JP | 7-182288 | 7/1995 |
| WO | WO 99/57860 | 11/1999 |

OTHER PUBLICATIONS

European Search Report for EP 01 11 5489, dated Oct. 12, 2005.

* cited by examiner

*Primary Examiner*—Thai Q. Tran
*Assistant Examiner*—Mishawn Dunn
(74) *Attorney, Agent, or Firm*—Ratner Prestia

(57) ABSTRACT

A recording and reproduction apparatus has
  a recording and reproduction control means of controlling recording in and reproduction from a main data recording region of a recording medium which has the main data recording region;
  a command reception means of receiving both raw access commands and non-raw access commands; and
  an authentication means of judging whether or not the command issuing origin should be authenticated based on the types of the received commands and of authenticating the command issuing origin according to the judgment result, wherein
  the recording and reproduction control means decides to carry out the received commands in the case that it is not necessary to authenticate the command issuing origin and in the case that the command issuing origin is authenticated and this authentication has succeeded.

11 Claims, 4 Drawing Sheets

Fig. 4

| purpose of use | CONTROL command |
|---|---|
| PLAY FORWARD | PLAY FORWARD |
| STILL | PLAY FORWARD PAUSE(still) |
| FASTEST FORWARD(Cue) | FASTEST FORWARD(Cue) |
| FASTEST REVERSE(Review) | FASTEST REVERSE(Review) |
| RECORD | RECORD |
| RECORD PAUSE | RECORD PAUSE |
| STOP | STOP |
| FAST FORWARD | FAST FORWARD |
| REWIND | REWIND |

24

| purpose of use | STATUS command |
|---|---|
| inquiry concerning VTR mechanism | TRANSPORT STATE? (mechanical condition) |
| inquiry concerning tape position | TIME CODE? (time code)<br>ATN? (absolute track number) |
| inquiry concerning type of equipment | UNIT INFO? (type/maker)<br>SUBUNIT INFO? (internal configuration of equipment) |
| inquiry concerning type of signal | INPUT SIGNAL MODE? (input signal)<br>OUTPUT SIGNAL MODE? (output signal) |

25

RECORDING AND REPRODUCTION APPARATUS, MEDIUM AND INFORMATION ASSEMBLY

BACKGROUND OF THE INVENTION

1. Field of the Invention

The present invention relates to a recording and reproduction apparatus which records and/or reproduces AV (audio visual) data, and to a medium and an information assembly.

2. Related Art of the Invention

In recent years, together with the spread and progress of personal computers, disk apparatuses, such as a magnetic disk apparatus, have been used as an external memory apparatus in a great number because of their large capacitance and high speed. Together with the significant expansion of computer software and the great increase of the capacitance for the handled data, these disk apparatuses used as the external memory apparatus have rapidly improved in areas of performance such as memory capacitance and processing speed.

By making good use of their high speed and their large capacitance disk apparatuses are being used not only in computers but also in digital AV equipment for recording and reproducing images and sound by applying digital technology.

In this manner, in an image and sound recording and reproduction apparatus, such as a magnetic disk apparatus, wherein AV data are recorded and reproduced by utilizing a disk medium, an Audio/Video Control (AV/C) command set is conventionally used at the time when AV data are recorded or reproduced. Here, the AV/C command set means an AV/C digital interface command set.

According to the AV/C command set, the AV data recorded in the disk medium are not directly accessed or a command for directly accessing management information which manages the AV data recorded in the disk medium is not supported. That is to say, recording or reproduction of AV data to or from the disk medium are controlled by a recording start command, a reproduction start command, a recording and reproduction stop command, and the like, and these commands are issued by designating the identification numbers of the AV data. Thus, the management information is managed by a controller inside of the image and sound recording and reproduction apparatus and, therefore, cannot be directly accessed from external equipment. In this manner, the image and sound recording and reproduction apparatus records or reproduces AV data by means of non-raw access commands such as an AV/C command set.

On the other hand, it is possible to connect the image and sound recording and reproduction apparatus to a personal computer. In the case that the personal computer accesses the disk medium, data are conventionally written in or read out by designating an LBA (logical block address). In the case that the image and sound recording and reproduction apparatus is connected to a personal computer in the above described manner, it would be advantageous if raw access commands could be utilized which carries out write in or read out of data on the disk medium by designating the LBA. In this case, the personal computer could directly access management information which controls the AV data concerning the disk medium or the AV data stored in the disk medium.

In the case that the image and sound recording and reproduction apparatus is not only connected to AV equipment but also can be connected to a personal computer, not only are AV data recorded and reproduced but also the AV data stored in the disk medium can be edited and processed by using the personal computer.

In this manner, by supporting not only a non-raw access command but also raw access commands, the image and sound recording and reproduction apparatus is not only connected to AV equipment but also is connected to a personal computer, plenty of functions such as recording, reproducing, editing and processing, and the like, can be provided.

In the case that a recording and reproduction apparatus such as an image and sound recording and reproduction apparatus is made to be connectable to a personal computer and AV equipment, however, the personal computer directly accesses the disk medium by designating an LBA, that it to say, it accesses the disk medium by using raw access commands and therefore, there is a possibility that the AV data recorded in a disk medium or the management information may be destroyed by mistake. In the case that such an event occurs, the image and sound recording and reproduction apparatus cannot carry out recording and reproduction of AV data.

That is to say, in the case that equipment for supporting raw access commands can be connected to a recording and reproduction apparatus, the problem arises that there is a possibility wherein the equipment for supporting the raw access commands mistakenly destroys either the AV data recorded in the disk medium or the management information for managing AV data.

SUMMARY OF THE INVENTION

Taking the above problem into consideration, the present invention has the purpose of providing a recording and reproduction apparatus, a medium and an information assembly which do not destroy the AV data stored in the disk medium of the recording and reproduction apparatus and the management information that manages AV data, even in the case that equipment for supporting raw access commands is connected to the recording and reproduction apparatus.

One aspect of the present invention is a recording and reproduction apparatus comprising:

a recording and reproduction control means of controlling recording in and reproduction from a main data recording region of a recording medium which has said main data recording region;

a command reception means of receiving both raw access commands and non-raw access commands; and an authentication means of judging whether or not the command issuing origin should be authenticated based on the types of said received commands and of authenticating said command issuing origin according to the judgment result, wherein said recording and reproduction control means is decides to carry out said received commands in the case that it is not necessary to authenticate said command issuing origin and in the case that said command issuing origin is authenticated and this authentication has succeeded.

Another aspect of the present invention is a recording and reproduction apparatus characterized in that said main data are AV data.

Still another aspect of the present invention is a recording and reproduction apparatus characterized in that said main data are AV data and data added to the AV data.

Yet another aspect of the present invention is a recording and reproduction apparatus characterized in that the types of said commands are either raw access commands or non-raw access commands and said authentication means judges that authentication should be performed in the case that the types of said received commands are raw access commands and that authentication is not necessary in the case that the types of said received commands are non-raw access commands.

Still yet another aspect of the present invention is a recording and reproduction apparatus according to 4th invention, characterized in that:

said main data recording region has a first region that can be accessed by both said commands and a second region that can be accessed only by said non-raw access commands;

the types of said commands are either commands that access said first region or commands that access said second region; and said authentication means judges whether or not authentication should be performed according to the type of said commands in the case that said received commands are raw access commands.

A further aspect of the present invention is a recording and reproduction apparatus according to any of 1st to 3rd inventions, characterized in that:

the types of said commands are write commands of raw access commands, read commands of raw access commands or non-raw access commands; and said authentication means judges that authentication should be performed in the case that the types of said received commands are write commands of raw access commands and that authentication is not necessary in the case that the types of said received commands are said raw access commands and are read commands as well as in the case that the types of said received commands are non-raw access commands.

A still further aspect of the present invention is a recording and reproduction apparatus according to any of 1st to 3rd inventions, characterized in that:

said main data recording region has a data region which records said main data and a management region which manages said recorded main data;

the types of said commands are either commands which access said data region or commands which access said management region; and said authentication means judges that authentication should be performed in the case that the types of said received commands are commands which access said management region and that authentication is not necessary in the case that the types of said received commands are commands which access said data region.

A yet further aspect of the present invention is a medium which carries a program and/or data for implementing, by a computer, all of, or a part of, the functions of all of, or a part of, the means of a recording and reproduction apparatus and which is characterized by being able to be processed by a computer.

A still yet further aspect of the present invention is an information assembly characterized by being a program and/or data for implementing, by a computer, all of, or a part of, the functions of all of, or a part of, the means of a recording and reproduction apparatus.

BRIEF DESCRIPTION OF THE DRAWINGS

FIG. 4 is a diagram showing examples of non-raw access commands in the embodiment of the present invention.

Figure 1:
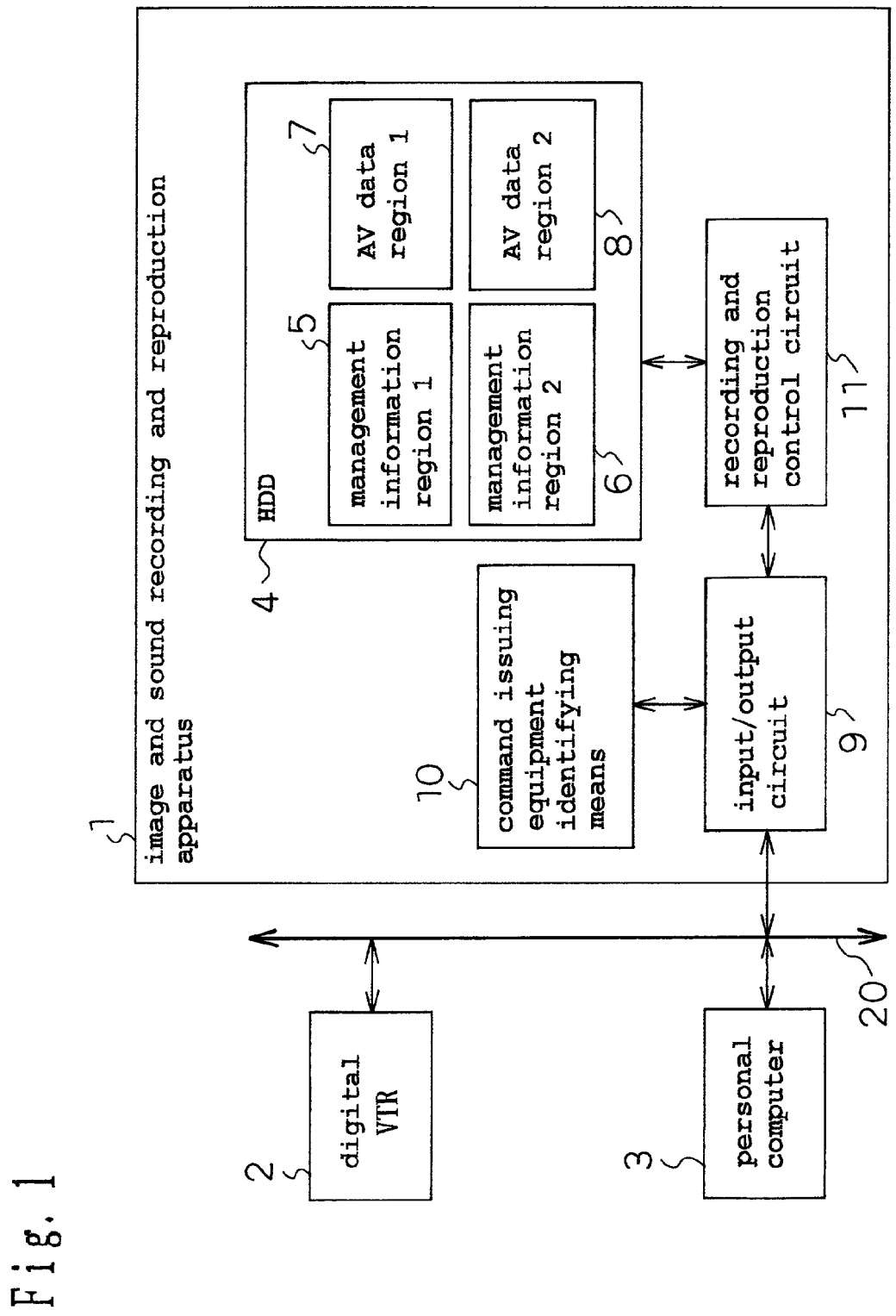
FIG. 1 is a diagram showing a configuration of an image and sound recording and reproduction apparatus according to the embodiment of the present invention.

EXPLANATION OF NUMERALS 1 image and sound recording and reproduction apparatus
2 digital VCR
3 personal computer
4 HDD
5 management information region 1
6 management information region 2
7 AV data region 1
8 AV data region 2
9 input/output circuit
10 command issuing equipment identifying means
11 recording and reproduction control circuit
20 bus
22 management information region
23 AV data region

PREFERRED EMBODIMENTS OF THE INVENTION

In the following, embodiments of the present invention are described in reference to the drawings.

(First Embodiment)

FIG. 1 shows a configuration of an image and sound recording and reproduction apparatus 1 according to the present embodiment.

The image and sound recording and reproduction apparatus 1 is connected to a bus 20. AV equipment, such as a digital VCR 2, and a personal computer 3 are also connected to the bus 20 such that the image and sound recording and reproduction apparatus 1 is a piece of equipment which records or reproduces AV data by receiving a command from the digital VCR 2 or the personal computer 3, i,e., the command issuing origin, and by carrying out the command.

The bus 20 is a bus defined, for example, by "IEEE Std 1394–1995, standard for high performance serial bus."

The digital VCR 2 is AV equipment which has a command issuing function so as to exchange AV data with the image and sound recording and reproduction apparatus 1 by using an AV/C command set and which records the AV data on a tape medium. In the following, the access command of the AV/C command set is referred to as a non-raw access command.

The personal computer 3 is equipment which accesses the image and sound recording and reproduction apparatus 1 by designating an LBA and which reads out AV data so as to edit and processes the read out AV data. In the following, the command which designates the LBA and accesses the magnetic disk medium in the image and sound recording and reproduction apparatus 1 is referred to as a raw access command.

The image and sound recording and reproduction apparatus 1 is formed of an HDD 4, a command issuing equipment identifying means 10, an input/output circuit 9 and a recording and reproduction control circuit 11.

The HDD 4 is a hard disk apparatus for recording or reproducing data into or from a magnetic disk medium. The magnetic disk medium to or from which the HDD 4 records or reproduces data is provided with an AV data recording region which is a region wherein AV data are recorded.

Then, as shown in FIG. 1, the AV data recording region is formed of a management information region 1, an AV data region 1 (5), a management information region 2 (7), an AV data region 2 (6) and an AV data region 2 (8).

The AV data region 1 (7) is a region, from among the regions wherein AV data are recorded, wherein AV data can be recorded and reproduced exclusively by a non-raw access command.

The management information region 1 (5) is a region, from among the regions wherein AV data are recorded, for storing information that manages the AV data recorded in the AV data region 1 (7).

The AV data region 2 (8) is a region, from among the regions wherein AV data are recorded, wherein AV data can be recorded and reproduced by both non-raw access commands as well as raw access commands.

The management information region 2 (6) is a region, from among the regions wherein AV data are recorded, for storing information that controls the AV data stored in the AV data region 2 (8).

The input/output circuit 9 is a circuit that inputs or outputs commands or AV data via the bus 20.

The command issuing equipment identifying means 10 is a means of determining whether or not the command issuing origin should be authenticated based on the type of the received command and of authenticating the command issuing origin according to the determination result.

The recording and reproduction control circuit 11 is a means of controlling the HDD 4 based on non-raw access commands or on raw access commands sent from the input/output circuit 9.

Figure 3:
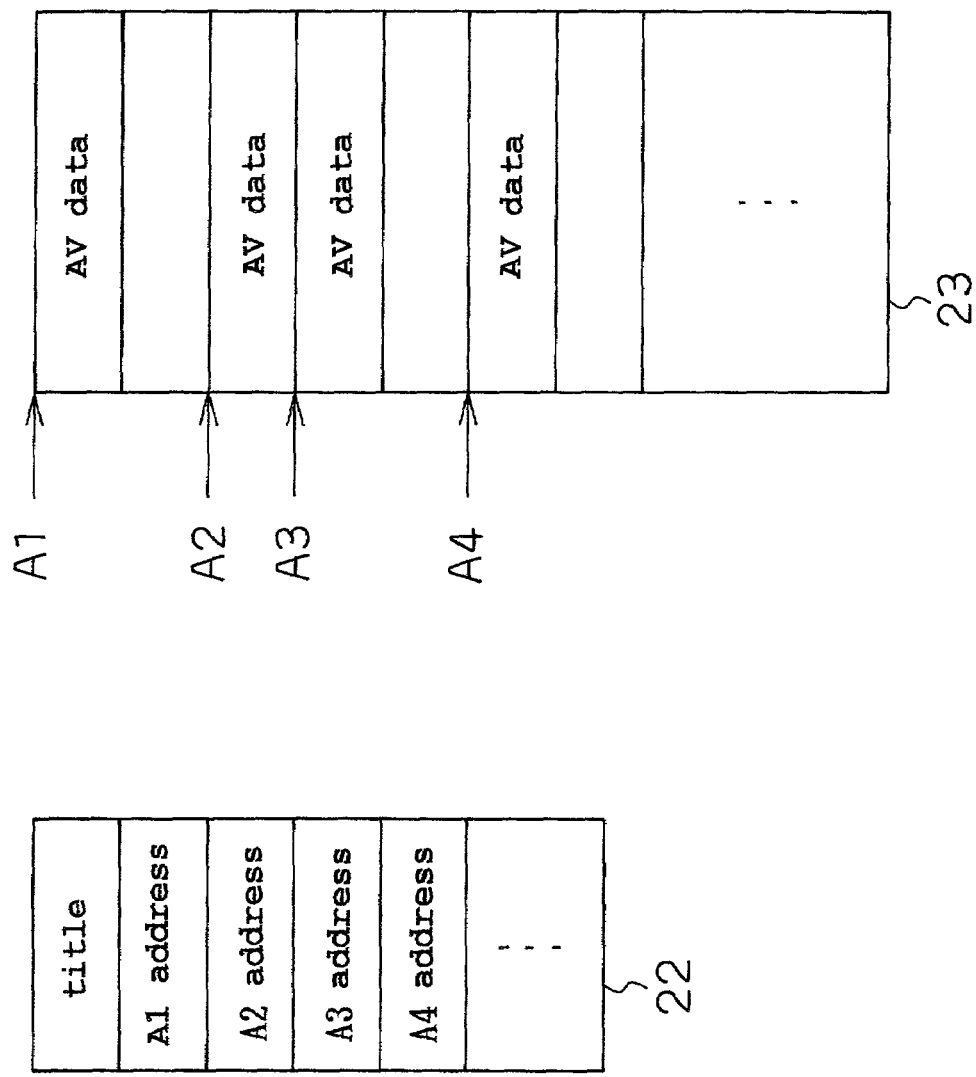
FIG. 3 is a diagram showing examples of a management information region and an AV data region according to the embodiment of the present invention.

FIG. 3 shows an example of either the management information region 1 (5) or the management information region 2 (6) as well as an example either the AV data region 1 (7) or the AV data region 2 (8).

A pair consisting of a title, which is the identification information of the AV data, and an address of the magnetic disk medium, wherein the AV data are stored, is stored in the management information region 22.

In addition, the AV data designated by the "title" in the region designated by the address of the management information region 22 are stored in the AV data region 23.

The image and sound recording and reproduction apparatus 1 can specify the position of the magnetic disk medium wherein the AV data are recorded by using the management information 22 and updates the management information region 22 when AV data are newly recorded on the magnetic disk medium.

FIG. 4 shows an example of a command in the AV/C command set which is an example of a non-raw access command.

In this manner, the non-raw access command designates the title of the AV data and sends a reproduction command to the image and sound recording and reproduction apparatus 1 and, thereby, can indicate that the image and sound recording and reproduction apparatus should reproduce the AV data designated by the title.

On the other hand, the raw access commands designate the LBA of the magnetic disk medium in the image and sound recording and reproduction apparatus 1 so as to read out or write in the data corresponding to the part of the designated LBA.

Here, the image and sound recording and reproduction apparatus 1 according to the present embodiment is an example of a recording and reproduction apparatus according to the present invention, the AV data according to the present embodiment are examples of main data according to the present invention, the recording and reproduction control circuit 11 according to the present embodiment is an example of a recording and reproduction control means according to the present invention, the command issuing equipment identifying means according to the present embodiment is an example of an authenticating means according to the present invention and the input/output circuit 9 according to the present embodiment is an example of a reception means according to the present invention.

Next, the operation of the above configured present embodiment is described.

First, the operation in the case where the digital VCR 2 reproduces the AV data recorded on the tape medium and the image and sound recording and reproduction apparatus 1 records those AV data is described.

First, the digital VCR 2 starts reproduction of the AV data recorded on the tape medium and, at the same time, feeds out recording commands in the form of non-raw access commands as shown in FIG. 4 to the image and sound recording and reproduction apparatus 1 via the bus 20.

The input/output circuit 9 receives the recording commands transmitted from the digital VCR 2 and, then, gives notification of this to the command issuing equipment identifying means 10.

The command issuing equipment identifying means 10 receives this notification and determines whether or not the command issuing origin should be identified based on the types of commands. In the case that the commands sent from the command issuing origin are non-raw access commands, it is determined that there is no need for authentication while in the case of raw access commands, it is determined that the command issuing origin should be authenticated. Then, according to this determination result, the command issuing equipment identifying means 10 authenticates the command issuing origin. Since non-raw access commands are sent from the digital VCR 2, the command issuing equipment identifying means 10 does not authenticate the digital VCR 2. Then, it notifies the input/output circuit 9 that there is no need to authenticate the digital VCR 2.

Then, the input/output circuit 9 notifies, via the bus 20, the digital VCR 2 that the recording commands are permitted.

The input/output circuit 9 sends the recording commands to the recording and reproduction control circuit 11.

The recording and reproduction control circuit 11 controls the HDD 4 so as to start preparation for recording upon receipt of the recording commands.

That is to say, the HDD 4 starts recording according to control by the recording and reproduction control circuit 11. That is to say, management information is prepared for recording in the management information region 1 from this point forward.

On the other hand, the VCR 2 outputs the reproduced AV data to the bus 20.

The input/output circuit 9 receives the AV data sent from the bus 20, which are outputted to the recording and reproduction control circuit 11.

When the AV data are inputted to the recording and reproduction control circuit 11, the address of the AV data region 1 (7) in the magnetic disk medium to be used for recording is determined so that the AV data are recorded in this address and the management information of the management information region 1 is updated.

The image and sound recording and reproduction circuit 1 consecutively records the AV data in such a manner.

Then, when stop commands are sent from the digital VCR 2, the recording and reproduction circuit 11 completes the recording of the AV data.

In this manner, the AV data sent from VCR 2 are recorded in the image and sound recording and reproduction apparatus 1. At this time, the VCR 2 directs the image and sound recording and reproduction apparatus 1 by using the non-raw access commands. Accordingly, the VCR 2 cannot directly indicate in which address of the magnetic disk medium the AV data are recorded and the recording and reproduction control circuit 11 determines in which address of the magnetic disk medium the AV data are recorded.

Next, the operation of the case where the image and sound recording and reproduction apparatus 1 records the AV data sent from a personal computer is described.

Figure 2:
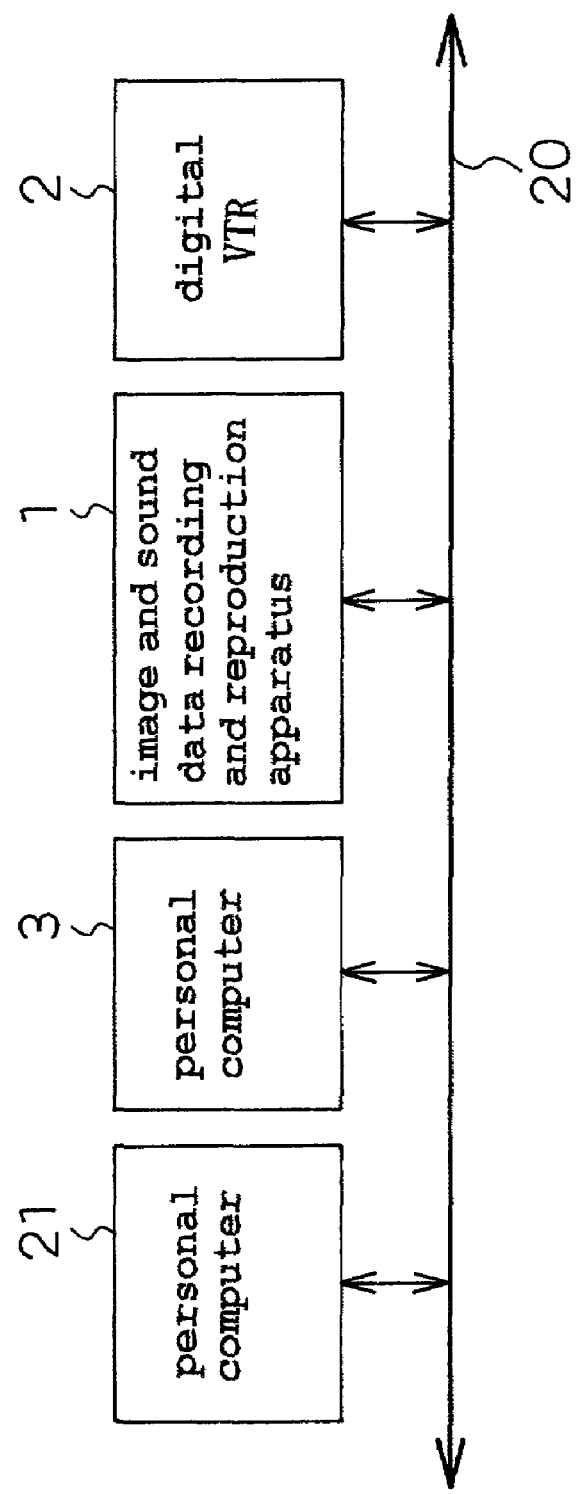
FIG. 2 is a diagram showing a configuration of equipment connected to a bus according to the embodiment of the present invention.

FIG. 2 shows equipment connected to the bus 20. In addition to the equipment shown in FIG. 1, a personal computer 21 is, further, connected. The personal computer 21 is assumed to be a piece of equipment that is not permitted to access the AV data region in the magnetic disk medium of the image and sound recording and reproduction apparatus 1 while the personal computer 3 is assumed to be a piece of equipment that is permitted to access the AV data region of the image and sound recording and reproduction apparatus 1.

First, the personal computer 21 that is not permitted to access the AV data region of the image and sound recording and reproduction apparatus 1 is assumed to have attempted to record the AV data in the image and sound recording and reproduction apparatus 1.

The personal computer 21 issues write commands to the image and sound recording and reproduction apparatus 1 via the bus 20.

Upon receipt of the write commands which have been sent from the personal computer 21, the input/output circuit 9 gives notification of the received commands to the command issuing equipment identifying means 10.

Upon receipt of this notification, the command issuing equipment identifying means 10 judges, in the case that the types of the received commands are raw access commands, that the command issuing origin must be authenticated and judges, in the case that the types of the received commands are non-raw access commands, that authentication is not necessary. Then, the command issuing origin is authenticated according to this judgment result. Because the raw access commands have been sent from the personal computer 21, the command issuing equipment identifying means 10 judges that the personal computer 21, which is the command issuing origin, must be authenticated and makes authentication. Because the personal computer 21 is not permitted to access the AV data region of the magnetic disk medium, this authentication will not succeed. Then, the command issuing equipment identifying means 10 gives a notification of the authentication result to the input/output circuit 9.

The input/output circuit 9 gives a notification of the authentication result to the digital personal computer 21 via the bus 20. In addition, the notification of the authentication result is given to the recording and reproduction control circuit 11 and the notification of the recording commands that have been sent from the personal computer 21 is also given to the recording and reproduction control circuit 11.

The recording and reproduction control circuit 11 does not execute the recording commands issued by the personal computer 21, even in the case that that they are received, according to the authentication result sent from the input/output circuit 9.

In addition, here, the personal computer 21 ignores the notification that reporting that authentication has not succeeded and further attempts to write the AV data into the AV data region of the image and sound recording and reproduction apparatus 1.

The input/output circuit 9 outputs the write commands sent from the personal computer 21 to the recording and reproduction control circuit 11.

The recording and reproduction control circuit 11 does not execute these recording commands based on the authentication result which has been sent.

Accordingly, the image and sound recording and reproduction apparatus 1 does not execute the commands sent from the personal computer 21, which is not permitted to access the AV data region of the image and sound recording and reproduction apparatus 1.

Next, the operation of the case wherein the personal computer 3 which has permission to access the AV data region of the image and sound recording and reproduction apparatus 1 records the AV data in the image and sound recording and reproduction apparatus 1 is described.

The personal computer 3 issues write commands in accordance with raw access commands to the image and sound recording and reproduction apparatus 1.

The command issuing equipment identifying means 10 judges that authentication should be carried out, and performs authentication, because the write commands are raw access commands.

As described above the AV data recording region of the magnetic disk medium is separated into the four regions of the management information region 1 (5), the AV data region 1 (7) the management information region 2 (6) and the AV data region 2 (8). In the following, whether or not authentication succeeds is described in each case according to the region in which the personal computer 3 records the AV data.

First, the personal computer 3 is assumed to have attempted to record the AV data in the management information region 1 (5) and the AV data region 1 (7).

In this case, authentication fails because access to the management information region 1 (5) and the AV data region 1 (7), which cannot be accessed with the raw access commands, is being attempted.

Next, the personal computer 3 is assumed to have attempted to record the AV data in the management information region 2 (6).

In this case, because the management information region 2 is not permitted to be accessed with the raw access commands, authentication fails.

Next, the personal computer 3 is assumed to have attempted to record the AV data in the AV data region 2 (8).

In this case, because the AV data region 2 (8) is a region which can be accessed with both the raw access commands and the non-raw access commands, authentication succeeds.

The command issuing equipment identifying means 10 makes notification of such authentication results to the input/output circuit 9.

The input/output circuit 9 makes notification of the authentication results sent from the command issuing equipment identifying means 10 to the recording and reproduction control circuit 11.

The recording and reproduction control circuit 11 determines whether or not the commands are executed based on authentication results. That is to say, the commands are carried out in the case that the personal computer 3, which is the command issuing origin, succeeds in authentication. And, the commands are not carried out in the case that authentication is not successful.

Accordingly, the personal computer 3 can send the raw access commands to the image and sound recording and reproduction apparatus 1 and can write the AV data into the AV data region 2 (8).

In this manner, the personal computer 3, which is permitted to write the AV data into the image and sound recording and reproduction apparatus 1, can write the AV data only in the AV data region 2 (8).

In addition, in the case that the personal computer 3 reproduces the AV data recorded in the image and sound recording and reproduction apparatus 1, the recording and reproduction control circuit 11 carries out the read commands without providing a particular limitation, even in the case that the related reproduction commands are raw access commands.

In this manner, only the pieces of equipment that are permitted to write in the AV data by using the raw access commands can operate. Accordingly, the pieces of equipment which are not permitted will not destroy the contents of the recording medium by writing the AV data in the magnetic recording medium with raw access commands.

In addition, as for the write in of AV data using the raw access commands, the AV data cannot be written into, even into the pieces of equipment wherein the AV data are permitted to be written, a management information region such as the management information region 1 (5) or the management information region 2 (6). Accordingly, the permitted pieces of equipment will not destroy the contents of the recording medium by writing the AV data in the management information region of the magnetic recording medium with the raw access commands.

In addition, even the pieces of equipment where the AV data are permitted to be written in by using the raw access commands cannot write the AV data in the AV data region 1 (7), wherein write in can be permitted only by using non-raw access commands. Accordingly, the important AV data are recorded in advance in the AV data region 1 (7) and, thereby, the AV data can be protected so that the AV data are not destroyed at the time of write in by using the raw access commands.

In addition, even in the pieces of equipment wherein the AV data are permitted to be written in by using the raw access commands, the AV data can be written in the AV data region 2 (8), wherein write in can be carried out only by using both the non-raw access commands and the raw access commands. Accordingly, because the permitted pieces of equipment can write the AV data into the magnetic disk medium by using the raw access commands, editing and processing of the AV data can be carried out.

Here, in the present embodiment, though it is described that in the case that the reproduction commands are raw access commands, the recording and reproduction control circuit 11 carries out these commands, the present invention is not limited to this. In the case that read commands are received and that these read commands are raw access commands to be read in from the AV data recording region, it is acceptable for these read commands not to be carried out so long as they are sent from a command issuing origin which is not permitted.

In addition, though in the present embodiment, the case is described wherein the management region is not permitted, at all, to be accessed by the raw access command for the purpose of data protection, the present invention is not limited to this. The management information may be permitted to be accessed by the raw access commands in equipment where there is no fear of data destruction.

In addition, though in the present embodiment, the command issuing origin is described as a piece of equipment such as a VCR or a personal computer, the present invention is not limited to this. The command issuing origin may be, for example, a particular process among a plurality of processes which are carried out in one personal computer. In this case, authentication processing is carried out in accordance with each process.

In addition, though in the present embodiment it is described that the digital VCR 2 is connected to the bus 20, the present invention is not limited to this. The case where an STB (set top box) is connected in place of the digital VCR 2, the case where an STB and a VCR are connected at the same time, and the like, are acceptable so long as, in short, one, or a plurality of, pieces of AV equipment which utilize non-raw access commands are connected to the bus 20.

In addition, though, in the present embodiment it is described that the personal computer is connected to the bus 20, the present invention is not limited to this. Any type of equipment, in place of the personal computer 20, maybe connected so long as it is equipment that utilizes raw access commands and records the AV data in the image and sound recording and reproduction apparatus 1.

In addition, though in the present embodiment it is described that the raw access commands are commands that access the AV data recorded in the magnetic disk medium by designating the LBA, the present invention is not limited to this. The raw access commands may simply be the commands which designate the location of the magnetic disk medium and which access the AV data in the designated location.

In addition, though in the present embodiment it is described that the non-raw access commands are commands that designate a title as the identification information of the AV data and that access the designated AV data, the present invention is not limited to this. They may be commands that access the AV data in the magnetic disk medium by using information which specifies the AV data other than titles, such as date and time, and identification numbers attached to the AV data. In short, the non-raw access commands may be any commands that are not commands which directly designate the location of the magnetic disk medium and which access the AV data in the designated location.

In addition, though in the present embodiment it is described that the image and sound recording and reproduction apparatus records in and reproduces from the magnetic disk medium, the present invention is not limited to this. It may record in and reproduce from a recording medium that is, in short, randomly accessible, such as an optical disk apparatus.

In addition, all of, or a part of, the functions of the all of, or a part of, the means of the recording and reproduction apparatus according to the present invention may be implemented by using hardware or may be implemented by using software.

In addition, a medium which carries a program and/or data for allowing a computer to implement all of, or a part of, the functions of the entirety of, or a part of, the means of the recording and reproduction apparatus according to the present invention and which is characterized in that it can be processed by a computer also belongs to the present invention.

In addition, an information assembly which is characterized by being a program and/or data for allowing a computer to carry out all of, or a part of, the functions of all of, or a part of, the means of the recording and reproduction apparatus according to the present invention also belongs to the present invention.

In addition, data of the present invention include data structure, data format, types of data, and the like. The medium of the present invention includes a recording medium such as a ROM, a transmission medium such as the Internet, a transmission medium such as light, radio waves, sound waves. The carrying medium of the present invention includes, for example, a recording medium which records a program and/or data, a transmission medium for transmitting a program and/or data. In addition, being able to be processed by a computer in the present invention includes being able to be read by a computer in the case of a recording medium such as a ROM and being able to be handled by a computer as a result of the transmission of a program and/or data which are transmission objects in the case of transmission medium. In addition, the information assembly of the present invention includes, for example, software such as a program and/or data.

In addition, the program recording medium which records the program and/or data for implementing, by a computer, all of, or a part of, the functions of all of, or a part of, blocks of the image and sound recording and reproduction apparatus according to the above described embodiment may be a program recording medium which can be read out by a computer so that the read out said program and/or data performs said functions in cooperation with the computer.

As is clear from the above description, the present invention can provide a recording and reproduction apparatus, a medium and an information assembly which do not destroy the AV data recorded on the disk medium of the recording and reproduction apparatus or the management information for managing the AV data, even in the case that a piece of equipment that supports the raw access commands is connected to the recording and reproduction apparatus.

What is claimed is:

1. A recording and reproduction apparatus comprising:
a recording and reproduction control means of controlling recording in and reproduction from a main data recording region of a recording medium which has said main data recording region;
a command reception means of receiving both raw access commands and non-raw access commands; and
an authentication means of judging whether or not a command issuing origin should be authenticated based on the types of said received commands and of authenticating said command issuing origin according to the judgment result, wherein
said recording and reproduction control means is decides to carry out said received commands in the case that it is not necessary to authenticate said command issuing origin and in the case that said command issuing origin is authenticated and this authentication has succeeded.

2. A recording and reproduction apparatus according to claim 1, characterized in that said main data are AV data.

3. A recording and reproduction apparatus according to claim 1, characterized in that said main data are AV data and data added to the AV data.

4. A recording and reproduction apparatus according to any of claims 1 to 3, characterized in that the types of said commands are either raw access commands or non-raw access commands and said authentication means judges that authentication should be performed in the case that the types of said received commands are raw access commands and that authentication Is not necessary in the case that the types of said received commands are non-raw access commands.

5. A recording and reproduction apparatus according to claim 4, characterized in that:
said main data recording region has a first region that can be accessed by both said commands and a second region that can be accessed only by said non-raw access commands;
the types of said commands are either commands that access said first region or commands that access said second region; and
said authentication means judges whether or not authentication should be performed according to the type of said commands in the case that said received commands are raw access commands.

6. A recording and reproduction apparatus according to any of claims 1 to 3, characterized in that:
the types of said commands are write commands of raw access commands, read commands of raw access commands or non-raw access commands; and
said authentication means judges that authentication should be performed in the case that the types of said received commands are write commands of raw access commands and that authentication is not necessary in the case that the types of said received commands are said raw access commands and are read commands as well as in the case that the types of said received commands are non-raw access commands.

7. A recording and reproduction apparatus according to any of claims 1 to 3, characterized in that:
said main data recording region has a data region which records said main data and a management region which manages said recorded main data;
the types of said commands are either commands which access said data region or commands which access said management region; and
said authentication means judges that authentication should be performed in the case that the types of said received commands are commands which access said management region and that authentication is not necessary in the case that the types of said received commands are commands which access said data region.

8. In a recording and reproduction apparatus receiving an access command from an external device, the access command being one of a raw access command and a non-raw access command, and the raw access command including one of read data and write data,
a method of controlling access to a data storage region in the recording and reproduction apparatus comprising the steps of:
(a) receiving an access command from the external device; (b) determining if the access command is a raw access command of read data;
(c) if step (b) determines that the access command is a raw access command of read data, permitting access to the external device which issued the raw access command;
(d) if step (b) determines that the access command is a raw access command of write data, performing the following steps:
(i) authenticating the external device which issued the raw access command; and
(ii) permitting access to the data storage region after authenticating the external device.

9. The method of claim 8 further Including the steps of:
(e) partitioning the data storage region into at least first and second data storage regions; and
(f) allocating the first data storage region for access by only a device transmitting a non-raw access command, and allocating the second data storage region for access by a device transmitting a raw access command; and step (d)(ii) includes permitting access to the second data storage region if the raw access command is write data to the second data storage region, and prohibiting access to the first data storage region if the raw access command is write data to the first data storage region.

10. A tangible program storage device readable by machine, embodying a program of instructions executable by the machine to perform method steps for recording and reproduction, said method comprising the steps of:

controlling recording in and reproduction from a main data recording region of a recording medium which has said main data recording region;

receiving both raw access commands and non-raw access commands;

judging whether or not a command issuing origin should be authenticated based on the types of said received commands and of authenticating said command issuing origin according to the judgment result, and deciding whether or not to carry out said received commands in the case that it Is not necessary to authenticate said command issuing origin and in the case that said command issuing origin is authenticated and this authentication has succeeded.

11. A computer program product comprising a tangible computer usable medium having computer readable program code means embodied therein for causing recording and reproduction, computer readable program code means in said computer program product comprising computer readable program code means for causing a computer to effect:

controlling recording in and reproduction from a main data recording region of a recording medium which has said main data recording region;

receiving both raw access commands and non-raw access commands;

judging whether or not a command issuing origin should be authenticated based on the types of said received commands and of authenticating said command issuing origin according to the judgment result, and deciding whether or not to carry out said received commands in the case that it is not necessary to authenticate said command issuing origin and in the case that said command issuing origin is authenticated and this authentication has succeeded.

* * * * *